United States Patent [19]

Loyer

[11] Patent Number: 4,652,874

[45] Date of Patent: Mar. 24, 1987

[54] SERIAL COMMUNICATION INTERFACE FOR A LOCAL NETWORK CONTROLLER

[75] Inventor: Bruce A. Loyer, Scottsdale, Ariz.

[73] Assignee: Motorola, Inc., Schaumburg, Ill.

[21] Appl. No.: 685,368

[22] Filed: Dec. 24, 1984

[51] Int. Cl.⁴ .......................... H04Q 9/00; H04J 3/02
[52] U.S. Cl. .................. 340/825.05; 370/85; 370/86
[58] Field of Search ............ 340/825.05, 825.5; 370/85, 86, 91, 94, 60, 99, 92; 375/8

[56] References Cited

U.S. PATENT DOCUMENTS

| | | | |
|---|---|---|---|
| 4,271,505 | 6/1981 | Menot et al. ........................ | 370/92 |
| 4,335,426 | 6/1982 | Maxwell et al. ............... | 340/825.05 |
| 4,521,882 | 6/1985 | Gabrielli et al. ...................... | 370/94 |
| 4,542,499 | 9/1985 | Bella et al. ........................... | 370/91 |
| 4,543,654 | 9/1985 | Jones .................................. | 340/825.5 |
| 4,583,089 | 4/1986 | Cope ............................... | 340/825.05 |
| 4,595,921 | 6/1986 | Wang et al. ...................... | 340/825.5 |

*Primary Examiner*—Donald J. Yusko
*Attorney, Agent, or Firm*—Dale E. Jepsen

[57] ABSTRACT

A serial communications interface for coupling a physical layer such as a modem to a media access control layer in a token bus network provides data and station management information therebetween on a plurality of bidirectional data lines providing management functions and a unique serial bus for control transfer in addition to communications data.

11 Claims, 12 Drawing Figures

| TXDATA | TYSYMI | TXSYMO | SYMBOL |
|--------|--------|--------|--------|
| LOW | LOW | LOW | ZERO |
| HIGH | LOW | LOW | ONE |
| X | HIGH | LOW | NON-DATA |
| X | LOW | HIGH | PAD-IDLE |
| X | HIGH | HIGH | SILENCE |

MAC/$\overline{SM}$ = HIGH

FIG. 5A

| RXDATA | RXSYMI | RXSYMO | SYMBOL |
|--------|--------|--------|--------|
| LOW | LOW | LOW | ZERO |
| HIGH | LOW | LOW | ONE |
| X | HIGH | LOW | NON-DATA |
| X | LOW | HIGH | BAD-SIGNAL |
| X | HIGH | HIGH | SILENCE |

$\overline{SMREQ}$ = HIGH

FIG. 5B

| SMRXD | JABINH | RSACK | SYMBOL |
|-------|--------|-------|--------|
| LOW | LOW | LOW | STATION MANAGEMENT ZERO |
| HIGH | LOW | LOW | STATION MANAGEMENT ONE |
| X | HIGH | X | JABBER INHIBIT INDICATION |
| X | X | HIGH | RESET ACKNOWLEDGE |

$\overline{SMREQ}$ = LOW

FIG. 5C

| SMTXD | TXDIS | RESET | SYMBOL |
|-------|-------|-------|--------|
| LOW | LOW | LOW | STATION MANAGEMENT ZERO |
| HIGH | LOW | LOW | STATION MANAGEMENT ONE |
| X | HIGH | LOW | TRANSMITTER DISABLE |
| X | X | HIGH | PHYSICAL LAYER RESET |

MAC/$\overline{SM}$ = LOW

SERIAL COMMUNICATION INTERFACE FOR A LOCAL NETWORK CONTROLLER

BACKGROUND OF THE INVENTION

The present invention relates, in general, to the field of serial communication interfaces and methods for a local area network controller.

More particularly, the present invention relates to a serial communications interface which connects the physical layer to the media access control layer of a local area network. The serial communications interface of the present invention is utilized to transfer serial data to and from a local area network controller such as a large scale integration (LSI) communications protocol integrated circuit.

A local area network node or station can be broken down into several layers. The first of these is the physical layer, or modem, which takes analog signals from the network cable and decodes them into digital signals. These digital signals are then passed to the media access control (MAC) layer which thereupon decides what to do with the data. The MAC also creates messages which it passes to the physical layer to be converted into the appropriate analog signals. The controlling of these layers is done by an entity called station management (SM) which must be able to talk to each of these layers in turn.

Therefore, the interface between the physical layer and the rest of the station has a several requirements. First, serial digital data must be passed between the physical layer and the MAC layer in both directions. Secondly, station management must have some means of communicating to and from the physical layer. Station management must be able to turn the physical layer transmitter off, and station management must know whether the physical layer is not receiving data as well as other similar functions. Finally, station management must have some means of communicating to and from the physical layer. At present, existing local area network (LAN) controllers utilize a simple interface which pass serial communications only.

SUMMARY OF THE INVENTION

It is therefore an object of the present invention to provide an improved serial communications interface for a local area network controller.

It is further an object of the present invention to provide an improved serial communications interface for a local area network controller which combines station management functions with normal data communications.

It is still further an object of the present invention to provide an improved serial communications interface for a local area network controller which reduces the required interfaces to a modem in local area network.

It is still further an object of the present invention to provide an improved serial communications interface for a local area network controller which provides added station management capabilities allowing greater control of data.

It is still further an object of the present invention to provide an improved serial communications interface for a local area network controller which effectively doubles the use of a serial communications interface to a local area network controller and expands its functionality.

The foregoing and other objects are achieved in the present invention wherein there is provided a local area network including a serial communications interface for coupling a physical layer to a media access control layer and providing data and station management information therebetween. A first control line coupled to the physical layer has first and second signals thereon and a plurality of bidirectional data lines interconnect the physical and media access control layers. In operation, the data and station management information may be transferred on the data lines to the physical layer from the media access control layer when the first and second signals are present respectively. In a more specific embodiment, a second control line coupled to the media access control layer and having third and fourth signals thereon may be provided whereby the data and station management information may be transferred on the data lines to the media access control layer from the physical layer when the third and fourth signals are present respectively.

BRIEF DESCRIPTION OF THE DRAWINGS

The foregoing and other features and objects of the present invention and the manner of attaining them will become more apparent and the invention itself will be best understood by reference to the following embodiment of the present invention taken in conjunction with the accompanying drawings, wherein.

DESCRIPTION OF A PREFERRED EMBODIMENT

Figure 1:
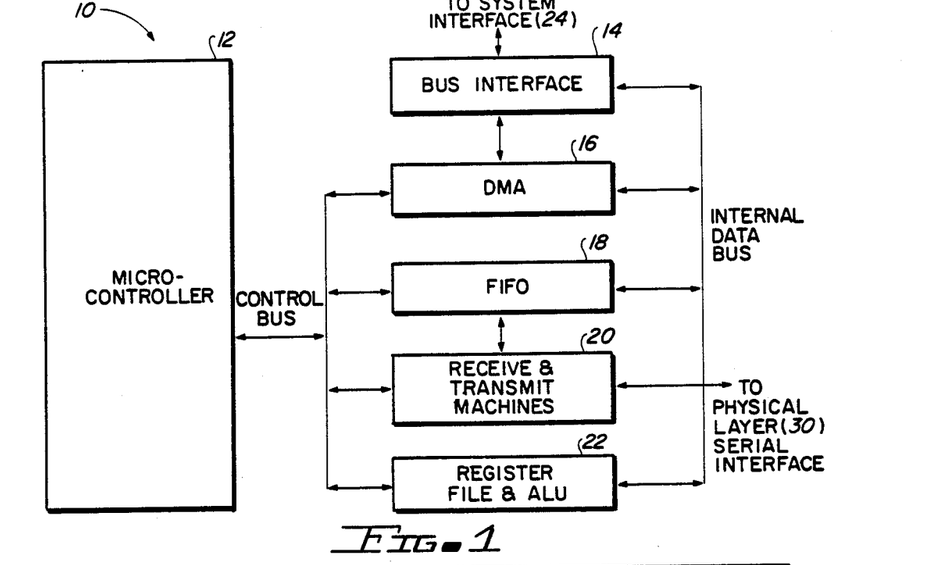
FIG. 1 is a simplified block diagram of a token bus controller for implementing the serial communications interface of the present invention.

With reference to FIG. 1, a simplified block diagram of a token bus controller 10 in accordance with the present invention is shown. Token Bus Controller (TBC) 10 may be conveniently furnished as a VLSI, high performance device that provides the Media Access Control (MAC) function for an IEEE 802.4 Local Area Network (LAN) node as described in IEEE Draft Standard 802.4 Rev. F, July, 1984 the contents of which is hereby specifically incorporated by reference. When interfaced with a suitable Physical Layer 30 function, TBC 10 can support both baseband and broadband networks at 1, 5, and 10 Megabits/second. It fully implements the sublayer of the IEEE 802.4 Token Bus Access Method standard plus real time extensions. In addition, network monitoring and diagnostics aids are provided. When designed using HCMOS technology, proprietary to Motorola, Inc. assignee of the present invention, TBC 10 provides low power as well as high performance with serial data rates up to 10 Mb/s. The device is configured to operate primarily in a local bus environment with supporting local memory 28 and microprocessor (MPU) 26. It can, however, be used easily in more cost-effective systems because it provides full Bus Master Mode (DMA) capability including a 32-bit address space and intelligent systems interface.

Figure 3:
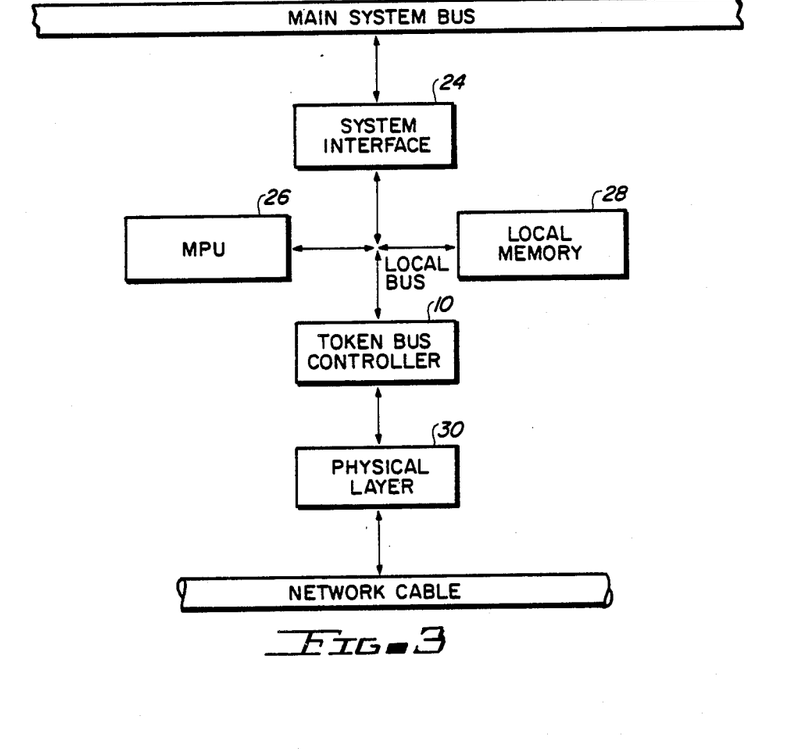
FIG. 3 illustrates a block diagram of a token bus local area network node utilizing the token bus controller of FIGS. 1 and 2.
Figure 4:
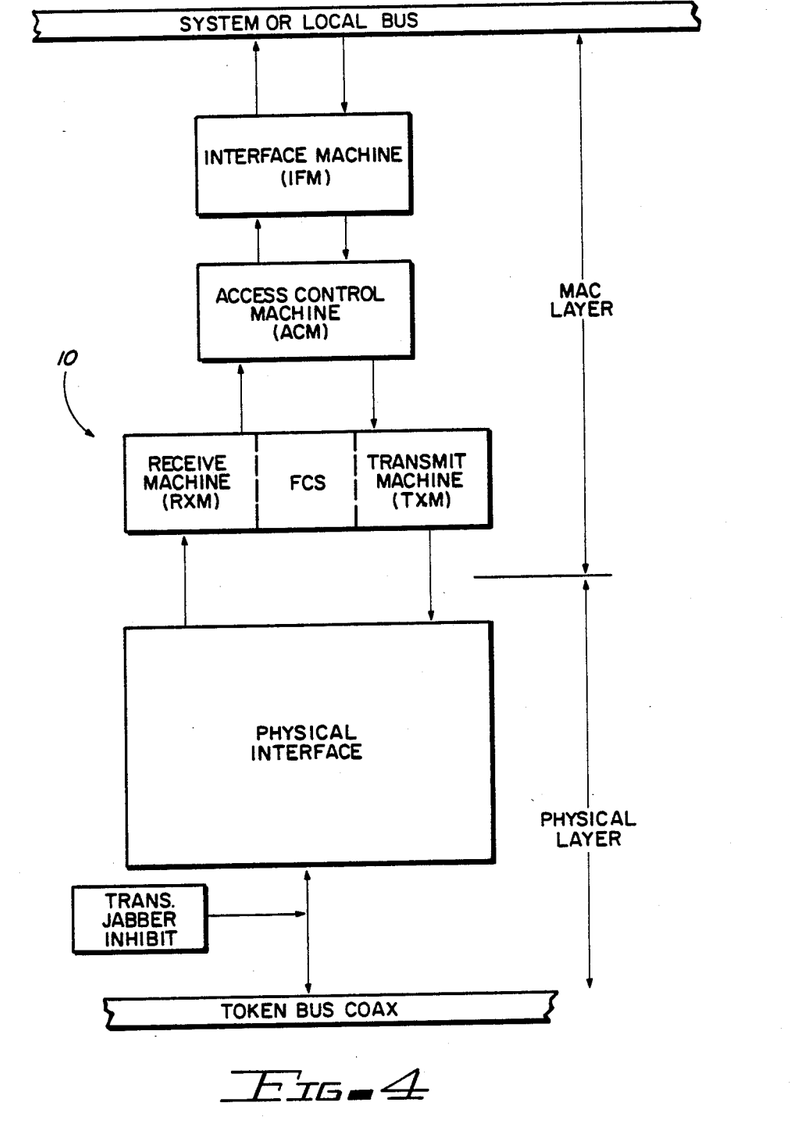
FIG. 4 illustrates a functional model of the token bus local area network node of FIG. 3.

TBC 10 is part of a multichip implementation of an IEEE 802.4 Token Bus LAN node. The simple model shown in FIG. 4 describes the functionality contained on the device and shows TBC 10 and physical layer 30. The 802.4 standard specifies three different Physical Layer/Media types (a phase continuous Frequently Shift Keyed (FSK) baseband, (a phase coherent FSK baseband, and a multilevel duobinary Amplitude Modulation/Phase Shift Keyed (AM/PSK) broadband). TBC 10 through its serial interface and functionality is designed to easily tie to any of these media. Acting as both a bus master and a peripheral device, TBC 10 is intended primarily to be used in a closely coupled configuration with a local processor and local resources (mainly local RAM), an example is shown in FIG. 3. The local resources provide:

1. Protocol control—Writing to TBC 10 as a peripheral, the local processor (MPU 26) initiates TBC 10 and sends command information. MPU 26 also manages message information through a linked buffer management scheme, and responds to interrupt requests for error handling and protocol command response. MPU 26 can also provide the LLC service to higher LAN communication levels.
2. Local memory—The local memory 28 (RAM) provides packet buffering, and serves as a communications media between MPU 26 and TBC 10, and is required for TBC 10 private parameter storage.
3. Fast bus cycle and response times—For high serial data rates (10 Mb/s) and minimum worst case frame spacing of 2.4 microseconds, TBC 10 requires a bus system interface 24 with high performance capability. A local resource/local bus architecture provides the best environment to meet these performance criteria.

The TBC 10 bus system interface 24 supports many variations on system architecture including non-MC68000 types with different byte ordering and control signals. Also, TBC 10 can directly interface to cost effective MC68020 based applications via the 32-bit address space.

Figure 2:
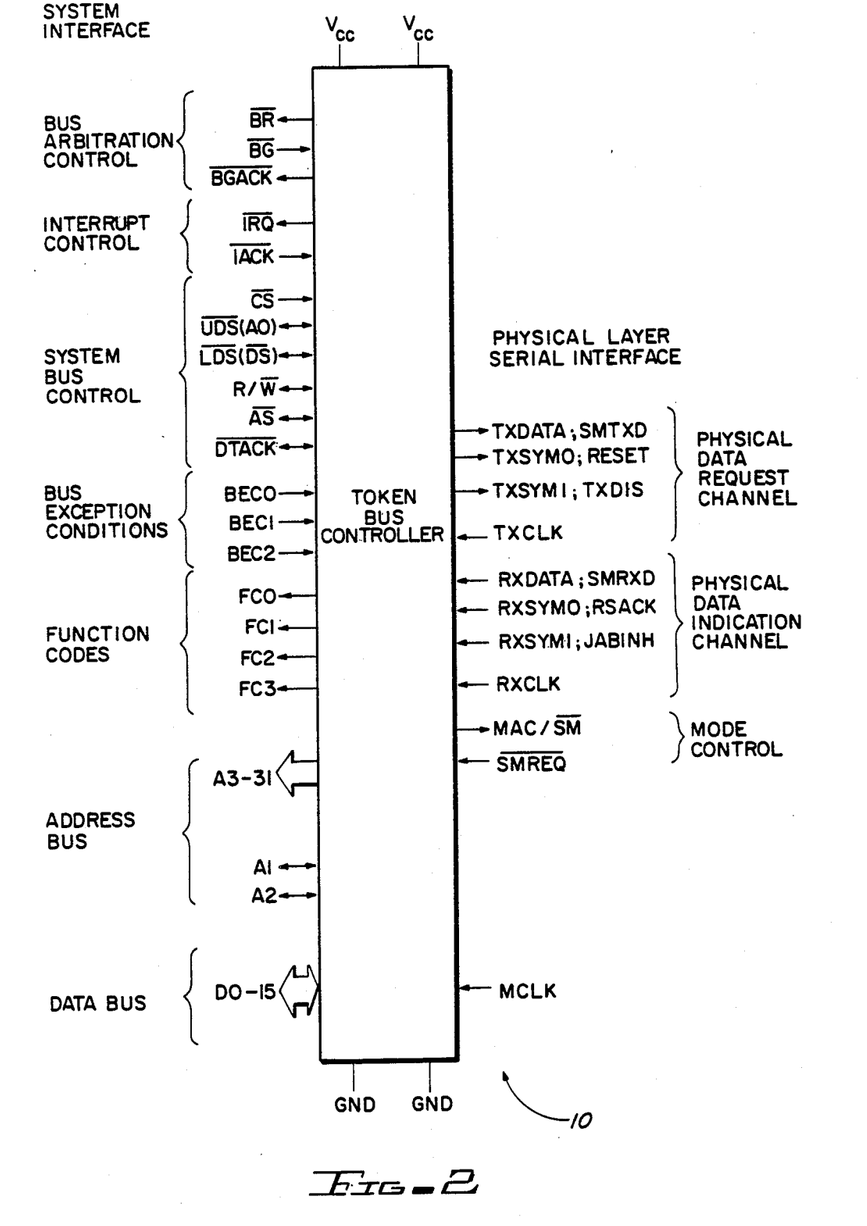
FIG. 2 illustrates the input and output signals of the token bus controller of FIG. 1.

FIG. 2 shows the input and output signals for Token Bus Controller 10 in an integrated circuit embodiment. While system interface 24 is shown as providing the complete control capability necessary to be both a bus master and slave (peripheral), such control may more also be provided by an interface between MPU 26 and TBC 10 (not shown). For DMA operation a full 32-bit address space and a 16-bit data path are provided. In addition to data transfer control signals, bus request/grant, bus exception condition, and function codes are provided. Also, as a peripheral function several registers may be written and read, and TBC 10 can request interrupts and provide an 8-bit interrupt vector.

Protocol Implementation—TBC 10 implements the sublayer of the IEEE 802.4 specification. It provides the required services of LLC-MAC Interface, Station Management-MAC Interface, and also supports Physical Layer Interface and Management. The device contains the functionality of the MAC Interface Machine (IFM), Access Control Machine (ACM), Receive Machine (RXM) and Transmit Machine (TXM) shown in FIG. 4.

System Interface—To support the requirements of the IEEE 802.4 protocol, TBC 10 provides three communication means via system interface 24 as shown in FIG. 2. These include:

1. A command channel—the system or host processor requests services from TBC 10 via the command channel. An 8-bit TBC Instruction Register (IR) is written upon to request a command. Activities such as chip initialization, mode set, LLC service, and Station Management services are activated by these commands.
2. Shared Memory tables and buffers—Memory structures used for communication between the system processor and TBC 10 include an initialization table, free frame and buffer descriptors lists, receive frame and buffer descriptors, receive data buffers, transmit frame and buffer descriptors lists, and transmit data buffers. The shared memory structures are used primarily for normal message flow and for the host processor to monitor TBC 10 activity.
3. Interrupt request—TBC 10 can generate interrupt requests and respond to an interrupt acknowledge bus cycle by providing an 8-bit vector. Interrupts are generated as the result of a conformation or indication of a service, or an error condition.

To facilitate the communications techniques, TBC 10 provides both bus master and slave capabilities.

Bus Master Mode (DMA)—The bus master mode is used to DMA required pointers and data into TBC 10 and to pass updated pointers, status, and data to memory. TBC 10 provides a full 32-bit linear address space allowing it to DMA directly into the entire space of any microprocessor including the MC68020 available from Motorola, Inc. assignee of the present invention. The parallel interface may be based on the MC68010 although it can be programmed to other types of processor interfaces (byte ordering and control line functionality). With specific reference to FIG. 2, the bus master mode involves the following signal lines:

1. Bus Request, Bus Grant, Bus Grant Acknowledge (BR BG, BGACK)—These 3 lines are used to request and hold use of the system during DMA activity.

2. Address Lines—The address lines provide a full 32-bit linear address space for DMA 16. The use of the address lines are in two categories:
   (a) A3-A31 are used only for master bus cycles.
   (b) A1-A2 and optionally (A0) are bidirectional used both for master bus cycles and for selecting internal registers during chip slave cycles.
3. Data Lines (D0-D7, D8-D15)—16 lines are provided for data transfer.
4. Function Codes (FC0-FC3)—These signals drive the corresponding function code lines for an M68020 type bus. Each DMA channel has a separate 4-bit function code register. Therefore, during a bus master cycle controlled by a given DMA channel, the associated function code is asserted to the bus. In this manner, the system controller can direct the cycles to be classified as user or supervisory, and data or program access. The function codes are included as part of the various pointers.
5. Bus Control Signals ($\overline{UDS}$ (A0), $\overline{LDS}$ ($\overline{DS}$), R/$\overline{W}$, $\overline{AS}$, $\overline{DTACK}$)—TBC 10 provides an asynchronous data transfer bus cycle. Although they may be an M68020 type control interface, the control lines (as well as byte ordering) are multifunctional and can be programmed at initialization. $\overline{UDS}$ and $\overline{LDS}$ are data strobes, R/$\overline{W}$ is a read/write indication signal, $\overline{AS}$ is address strobe, and $\overline{DTACK}$ is data transfer acknowledge.

The TBC 10 bus interface is asynchronous with $\overline{AS}$, $\overline{LDS}$ ($\overline{DS}$), $\overline{UDS}$ (A0), and $\overline{DTACK}$ controlling timing. The asynchronous nature of bus interface 14 allows adjustment of the bus cycle time by $\overline{DTACK}$. Bus cycle times are a minimum of 4 chip clock cycles and increase in increments of clock cycles.

Perforance Factors—The worst case performance requirement demanded of TBC 10 is the 10 Mb/s data rate of the Serial Interface. With a 16-bit parallel transfer capability, the 10 Mb/s serial translates to a requirement for a system bus data transfer cycle averaging every 1.6 microseconds. If TBC 10 is used in an environment where it must share its system bus with another processor(s), the system design must provide sufficient performance to meet the needs of TBC 10 and the other processor.

The characteristics of TBC 10 that affect system performance are:
1. A 32-byte FIFO 18 is provided for message buffering.
2. The minimum read or write cycle time for TBC 10 is 4 chip clock cycles (400 ns minimum with a 10 MHz chip clock). This implies a "no wait-state" memory and suitable memory cycle time. Bus cycle times increase in increments of the chip clock cycle times (100 nanoseconds for 10 MHz).
3. A DMA 16 request is initiated after 8 bytes in FIFO 18 have been filled. This implies 19.2 microseconds latency time (24 bytes×8 bits/byte×0.8 microseconds/bit) before TBC 10 must be given the bus.

The local resources system configuration provides the most effective architecture. As an example, if local memory 28 cycle time is 500 nanoseconds and average arbitration time is 500 nanoseconds, TBC 10 consumes a maximum of approximately ⅓ of bus availability.

Bus Slave Mode (Peripheral)—The bus slave mode is used to write initialization information and commands to TBC 10 and to write the interrupt vector. The bus slave mode involves the following signal lines:

1. Address Lines (A1-A2)—These lines are used to select internal registers.
2. Data Lines (D0-D7, D8-D15)—16 lines are used for data transfer.
3. Control Lines ($\overline{CS}$, $\overline{UDS}$ (A0), $\overline{LDS}$ ($\overline{DS}$), R/$\overline{W}$, $\overline{AS}$ $\overline{DTACK}$)—These control lines provide asynchronous data transfer bus cycle. $\overline{CS}$ is the chip select used to indicate that TBC 10 is being accessed. $\overline{UDS}$ and $\overline{LDS}$ are the data strobes, R/$\overline{W}$ indicates a read or write cycle, and $\overline{DTACK}$ is returned by TBC 10 to indicate cycle termination.

The primary means of communication between the host processor and TBC 10 is through shared memory structures. However, the slave mode allows the TBC 10 initialization vector to be programmable (the memory tables then can be located anywhere in memory), commands to be sent directly to TBC 10 causing more timely response, and the interrupt vector to be programmed.

Interrupt Request—TBC 10 can generate an interrupt request from several sources, however, only one interrupt request line is asserted. When the interrupt request is acknowledged, an 8-bit vector is provided in which the upper 6 bits are driven from the Interrupt Vector Register (IV) and the lowest 2 bits are dependent on the interrupt request source.

The associated signal lines are:
1. Interrupt Request ($\overline{IRQ}$)—This output is asserted by TBC 10 to request an interrupt acknowledge.
2. Interrupt Acknowledge ($\overline{IACK}$)—This input is asserted to signal an interrupt acknowledge cycle. TBC 10 responds by reading the interrupt vector and puts it on the data bus.
3. Data Lines (D0-D7)—The 8-bit interrupt vector is read from these data lines.
4. Control Lines ($\overline{LDS}$ ($\overline{DS}$), R/$\overline{W}$, $\overline{DTACK}$)—These additional control lines are used during the interrupt acknowledge cycle. R/$\overline{W}$ indicates a read bus cycle. $\overline{LDS}$ is asserted to indicate the data transfer is on the lower 8-bits of the data bus. TBC 10 asserts $\overline{DTACK}$ when the vector is available on the data bus.

The interrupt vector is programmable by the host system. The most significant 6-bits of the vector are supplied by the IV register which is user programmed. The lowest 2-bits of the vector are a prioritized code from 4 sources of interrupts on TBC 10; which are (in order) initialization failure, MAC status, RX channel, TX channel. If the vector is not initialized by the user, TBC 10 uses a default value of 15 (decimal).

Physical Layer Serial Interface—TBC 10 connects to an IEEE 802.4 physical layer 30 function that contains circuitry for transmission of data units across the physical medium and also for communicating those data units with the MAC layer (TBC 10). The physical layer 30 interface provides means for transferring requests for data unit transmission, indicating data unit reception, and station management of physical layer 30. Each Physical Service Data Unit is a symbol of a serial data transmission and they are delivered in the same order in which they are submitted to physical layer 30 by the MAC.

Physical layer 30 produces within itself the timing signals for each symbol (Physical Data Unit). Physical layer 30 accepts a limited set of service primitives from the MAC which defines the transmitted signal at each timing interval (clock period), and in turn, sends to the MAC one of another set of clocked primitives based on reception of information from the medium.

The physical layer 30 interface Shown in FIG. 2 the consists of three functions:

1. Physical Data Request Channel—When programmed for MAC operation, this channel provides encoded requests (atomic symbols) for data unit transmission. The encoded symbols (lines TXSYM0, TXSYM1, TXDATA) are synchronized to the physical layer 30 generated TX clock.
2. Physical Data Indication Channel—When programmed for MAC operation, this channel provides encoded indications of data unit reception. The encoded symbols (lines RXSYM0, RXSYM1, RXDATA) are synchronized to the physical layer 30 generated RX clock.
3. Physical Layer Management—TBC 10 provides the ability to pass a Station Management request to physical layer 30. A signal line is provided (MAC/$\overline{\text{SM}}$) which indicates when a station management mode is envoked. The encoded symbol lines provide a dual functionality where management requests and indications are passed between TBC 10 and physical layer 30. Also, a request line (SMREQ) is provided for physical layer 30 to indicate a need for service, and also indicates when the physical layer 30 is in the station management mode.

Physical Data Request Channel (MAC/$\overline{\text{SM}}$=high, MAC Mode)—The class of service primitives associated with the request channel is:

PHY_DATA request <symbol>

Figure 5A:
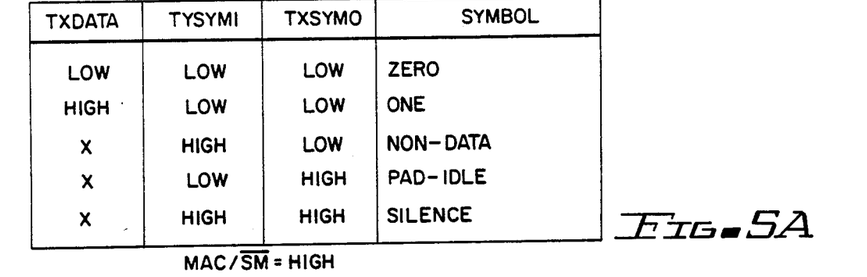
FIG. 5A shows a representative truth table for a serial communications interface in accordance with the present invention when a high signal level appears on MAC/$\overline{SM}$.

The PHY_DATA request primitives are synchronized to the TXCLK (transmit clock) supplied by physical layer 30. The PHY_DATA request <symbol> set is:

1. ZERO—The logical data state zero
2. ONE—The logical data state one
3. NON-DATA—Delimiter flag, always sent in pairs
4. PAD-IDLE—One symbol of preamble/interframe idle
5. SILENCE—Transmit silence The symbol encoding is shown in FIG. 5A.

The symbol timing will be such that the indication lines will be valid for a specified time before the rising clock edge of TXCLK.

Physical Data Indication Channel ($\overline{\text{SMREQ}}$=high; MAC Mode)—The class of service primitives associated with the indication channel is:

PHY_data indication <symbol>

Figure 5B:
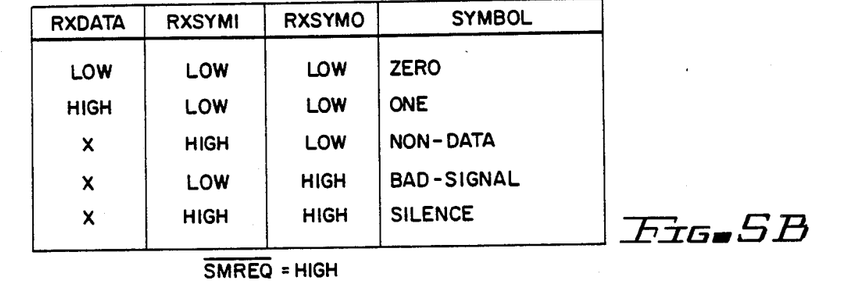
FIG. 5B illustrates a representative truth table for a serial communications interface in accordance with the present invention when a high signal level appears on $\overline{SMREQ}$.
Figure 5C:
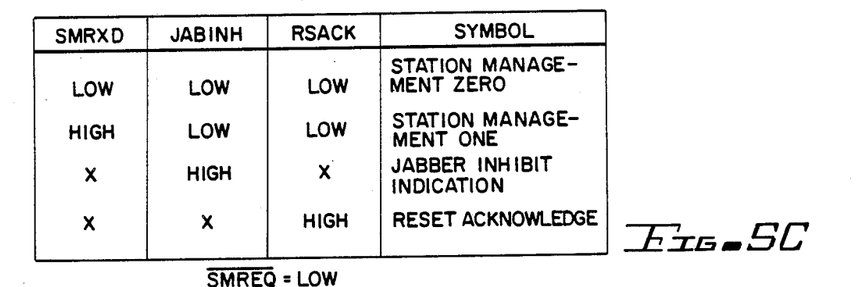
FIG. 5C illustrates an analogous truth table to that shown in FIG. 5B when a low signal level appears on $\overline{SMREQ}$.
Figure 5D:
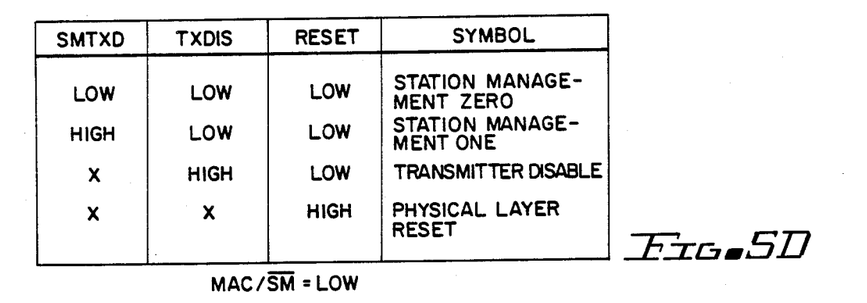
FIG. 5D illustrates an analogous truth table to that shown in FIG. 5A when a low signal level appears on MAC/$\overline{SM}$.

The PHY_DATA indication primitives are synchronous to the RXCLK (receive clock) supplied by the physical layer. The PHY_DATA indication <symbol> set is:

1. ZERO—The logical data state zero
2. ONE—The logical data state one
3. NON-DATA—Delimiter flag, always present in pairs
4. SILENCE—Received silence or pseudo-silence
5. BAD-SIGNAL—Illegal symbol or untranslatable sequence The symbol encoding is shown in FIG. 5B. The symbol timing will be such that indication lines will be valid for a specified timing before the rising edge of RXC.

Physical Layer 30 Management—Station management is not a function of the MAC sublayer of the Token Bus node. However, TBC 10 provides a station management-physical layer 30 interface to facilitate control of physical layer 30. The SM-PL interface uses a request/confirmation model similar to the other IEEE 802.4 interfaces. To perform the station management functions TBC 10 is first put into an "offline" mode, that is, not receiving or transmitting information. The host processor can then request required management functions.

A signal is provided called MAC/$\overline{\text{SM}}$ that is set low to indicate station management functionality of the request channel. In this condition, the physical data symbol lines (TXSYM0, TXSYM1, TXDATA) serve a different function. These lines are used to implement the required station management primitives. Requests to physical layer 30 in this mode are synchronized to the TX clock.

A second signal is provided called $\overline{\text{SMREQ}}$ that is set low by physical layer 30 (modem) to indicate that it is in the station management mode. The $\overline{\text{SMREQ}}$ can be set low in response to TBC 10 being put in SM mode or by the physical layer having a need for SM service. An example of the latter case is the jabber inhibit timer shown in FIG. 4 which may time-out indicating a transmitter fault. When the $\overline{\text{SMREQ}}$=low, the indication channel symbol lines (RXSM0, RXSYM1, RXDATA) serve as SM inputs. These lines are used to implement the station management primitives. Confirmations from physical layer 30 are synchronized to the RX clock. Individual signal lines are used to provide four mandatory station management primitives:

1. PHY_RESET Request—The PHY_RESET output (reset) of TBC 10 can be set and cleared via the command channel.
2. PHY_REST Confirmation—the PHY_RESET CONF input (RSACK) sent to TBC 10 in response to the PHY_RESET command (output). This status is passed to the Station Management via TBC 10.
3. PHY_MODE SELECT Request—TBC 10 provides an output that is a transmitter output inhibit (TXDIS). Commands to TBC 10 can set or clear this output.
4. PHY_MODE SELECT Confirmation—An input to TBC 10 indicates the status of the transmit output (JABINH). If the transmitter has been disabled in response to a request (TXDIS) or the watchdog timer timing out, this line is asserted and the status is passed to station management by TBC 10.

In addition, a data transmit line (SMTXD) and a data receive line (SMRXD) are used to request/indicate service primitives not specifically done by the above lines. The SMTXD and SMRXD are simple transmit and receive channels in which data is transferred in octets and synchronously clocked by the appropriate clock. The advantages of providing these channels is the ability to expand the station management service for more "intelligent" physical layers 30 and still have a simple interface for a minimum functionality physical layer 30.

Memory Structures and Buffer Management—The IEEE 802.4 protocol requires 4 levels of message priority. To support 4 transmission queues, 4 receive queues, and other functions, TBC 10 uses a powerful, flexible memory and buffer management structure. TBC 10 supports minimal on-board registers and primary communication between the host processor and TBC 10 through common RAM. The host accessible registers include:

1. IR—an 8-bit Instruction Register used to send TBC 10 commands (instructions).

2. IV—an 8-bit Interrupt Vector register used to store the interrupt vector for an IACK cycle.
3. DIR—a 32-bit Data In Register used as a data input port to receive initialization pointers and data.

The RAM based structures that TBC 10 uses include:
1. TBC Private Area—used by TBC 10 to store internal variables and statistical information.
2. Initialization Table—used by the host to pass initialization parameters and pointers to TBC 10. Also, TBC 10 maintains status indicators and command response information within this table.
3. Frame Descriptors (FD) Lists(s)—contain a linked list of message frame descriptors. Separate lists are maintained for a free FD pool, 4 receive queues, and 4 transmit queues.
4. Buffer Descriptors (BD) List(s)—contain a linked list of data buffers. Separate BD lists are associated with a free buffer pool and with each message frame in either a transmit and receive queue.
5. Data Buffers—the data buffers are linked via a buffer descriptor list into the free buffer pool, a received message, or a message ready for transmission.

Figure 6:
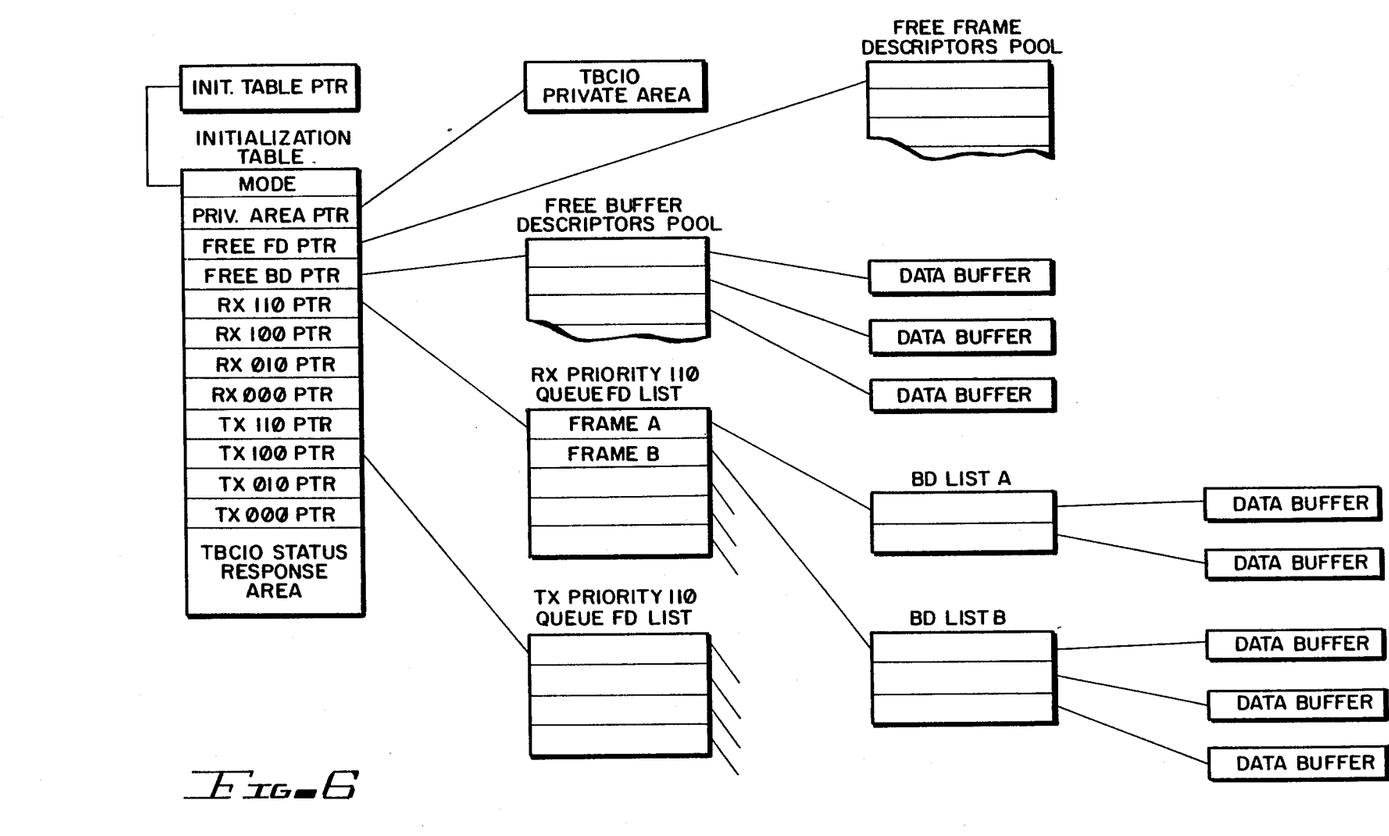
FIG. 6 illustrates a token bus controller memory structure for use in implementing the serial communications interface of the present invention.

FIG. 6 shows the interrelationships of the structures used by TBC 10 in its buffer management. As part of the initialization routine, the host processor loads the Initialization Table Pointer into TBC 10 and then writes a command for TBC 10 to begin. Contained within the Initialization Table are pointers that set up the buffer management.

A configured message frame contains a frame descriptor, a buffer descriptors list, and associated data buffers. The frame descriptor consists of frame attributes (source address, destination address, size, etc.), a pointer to the associated BD, and a pointer to the next element on FD queue. The BD list is a linked set of buffer descriptors where each descriptor contains a pointer to its assigned buffer, a pointer to the next BD in the list and other buffer attributes. There is one data buffer for each buffer descriptor.

To support the IEEE 802.4 message priorities, 4 transmit FD queues and 4 receive FD queues are maintained. For transmission the host processor adds frame descriptors (messages) to a transmit queue and TBC 10 removes them as they are sent out. For reception, TBC 10 adds frame descriptors (messages) as they are received, assigning them to the proper queue. The host then removes messages from the receive queues as they are assimilated.

The Initialization Table contains pointers to the head of each queue, 8 pointers in all. In reality the receive queue pointers are both the "head" and the "tail" of the queue because the queue is a null set at initialization. Additional pointers must also be supplied for a Free Buffer Descriptors Pool and a Free Frame Descriptors Pool.

The Free FD Pool and Free BD Pool are used to "save" empty buffers for receiving messages frames. As a frame is received, the next free frame descriptor is taken from the pool and linked to the next available buffer descriptor. The received data is written into the associated data buffer. If more than one data buffer is needed, it is accessed through the linked BD. The buffer descriptors are prelinked within the buffer pool to simplify this process.

After the received message is complete, the frame descriptor is updated with frame parameters and linked to the appropriate receive queue (based on priority). TBC 10 maintains pointers to each of the receive queues so that it can add frame descriptors as messages are received.

The buffer management structure is powerful and very flexible. The host has to maintain only the Free FD Pool for receiving messages because TBC 10 can dynamically allocate buffers to the appropriate queue. Also, the host can generate frame descriptors independently of the message content and link the FD to the BD list without altering the buffer descriptors. This scheme also makes very efficient use of memory space.

Operational Modes—TBC 10 has several programmable modes which determine its interaction with the Token Bus Activity including:

Offline Mode—Upon powerup or reset, TBC 10 assumes the offline mode and neither receives nor transmits information. Internal diagnostics are executed in the offline mode station management of the physical layer 30, and initialization of TBC 10 is also executed in this situation.

Passive Mode—TBC 10 assumes the passive mode if it has nothing to transmit and is not specifically required to be in the logical token passing ring. This mode can be used for receive only stations and/or network monitors. That is, in the passive mode TBC 10 can receive, but not send any information.

Active Mode—TBC 10 assumes the active mode when it desires to be part of the active token passing logical ring. In the active mode, TBC 10 transmits any pending messages when it receives the token. TBC 10 enters the active mode whenever messages are presented for transmission or it can be programmed to remain in the active mode. If TBC 10 is not specifically programmed to remain part of the token passing logic ring, TBC 10 will drop out of the ring if no messages are queued waiting for transmission.

Diagnostic and Monitoring Services—TBC 10 provides different services that aid in diagnosing chip and system faults as well as gathering statistics of network performance.

Diagnostics Instructions—To test the integrity of TBC 10, several diagnostics instructions (commands) are provided. TBC 10 must be in the offline mode to respond to these instructions. The services provided include a read-modify-write sequence to test DMA 16 channel controller, an internal loopback test, ability to save and restore internal registers, and an on-board diagnostics test of internal resources (done via microcode).

Diagnostics Mode—Modifications to TBC 10's normal operating modes can be preset to monitor network activity when in the passive or active modes. TBC 10 can be programmed to retain base frames, pass received FCS data, and transmit special FCS data by disabling the on-board FCS generator. These operating modes can be used separately or combined to generate and check nonstandard data frames to test the integrity of various station elements and hardware.

Monitoring Services—The network monitoring services consist of two capabilities. The first is an on-going statistics gathering function of network parameters. These parameters consist of token rotation time, number of transmitted frames, number of valid received frames, number of invalid received frames, number of receive frames discarded due to overflow, number of transmit frames aborted due to underflow, number of transmit frames discarded due to lack of receive buffers, and others as required. The second monitoring service is the ability to copy all message traffic on the Token Bus. Two modes are available, one of which copies all data frames on the network and the other copies all MAC management frames. These may be used separately or together to facilitate a network monitor or "promiscuous listener" mode.

With specific reference to FIG. 2 the following TBC 10 pin definitions pertain:

| SIGNAL MNEMONIC | TYPE I-INPUT O-OUTPUT T-THREE-STATE | DESCRIPTION |
|---|---|---|
| $\overline{BR}$ | O | Bus request. Asserted when TBC 10 requests system bus to become master. |
| $\overline{BG}$ | I | Bus grant. Received from the system bus arbitration when TBC 10 has been given the bus. |
| $\overline{BGACK}$ | I/O,T | Bus grant acknowledge. This signal is first detected by TBC 10 (when it wants to become bus master). If $\overline{BGACK}$ is not asserted, $\overline{BG}$ is asserted, $\overline{AS}$ is not asserted and $\overline{DTACK}$ is not asserted, then TBC 10 asserts this signal. |
| $\overline{IRQ}$ | O | Interrupt request. Asserted by TBC 10 request an interrupt acknowledge. An open-drain output. |
| $\overline{IACK}$ | I | Interrupt acknowledge. Asserted by host when it is going to read an interrupt vector. TBC 10 responds by putting interrupt vector on Data Bus. |
| $\overline{CS}$ | I | Chip select. This input is asserted whenever the host MPU 26 accesses TBC 10 as a peripheral device. |
| $\overline{UDS}$ (AO) | I/O,T | Upper data strobe or address bit AO. When TBC 10 is programmed for 16-bit data transfers, this signal is the upper data strobe (output for DMA 16 operation; input for peripheral operation). When TBC 10 is programmed for 8-bit data transfers, this signal is AO. |
| $\overline{LDS}$ ($\overline{DS}$) | I/O,T | Lower data strobe or simple data strobe. When TBC 10 is programmed for 16-bit data transfers, this signal is the lower data strobe. When TBC 10 is programmed for 8-bit data transfers, this signal is the data strobe. |
| R/$\overline{W}$ | I/O,T | Read/write. This signal indicates whether a bus cycle is a read or write access, and it is an output when TBC 10 is bus master. |
| $\overline{AS}$ | I/O,T | Address strobe. An output that indicates valid address when TBC 10 is bus master. Also, used as an output when identifying a free bus during arbitration. |
| $\overline{DTACK}$ | I/O,T | Data transfer acknowledge. Asserted as output when TBC 10 is bus slave. Input to TBC 10 when TBC 10 is bus master. |
| BEC0:BEC2 | I | Bus exception conditions. Input code that signals bus exception conditions to TBC 10; reset (BEC2, 1, 0 = 000), bus error (101) retry (100) halt (110), and relinquish (011). Other combinations reserved. |
| FC0:FC3 | O | Function codes. Outputs that are asserted during a DMA 16 bus cycle. These are used to partition memory into various address spaces. |
| A3:A31 | O | Address lines. Provides upper address during TBC 10 DMA 16 bus cycles. |
| A1:A2 | I/O,T | Address lines. Provide lower address during DMA 16 bus cycles. Also used as address inputs when host is addressing TBC 10 as a peripheral. |
| D0:D15 | I/O,T | Data bus. Used both in master and slave operation. Restricted to D0:D7 in 8-bit mode. |
| MCLK | I | Master clock 2-10 Mhz. |
| TXDATA; SMTXD | O | TX serial data. When MAC/$\overline{SM}$ is asserted, this is station management serial data out. When MAC/$\overline{SM}$ is not asserted, this is normal TX serial data. |
| TXSYM0: RESET | O | TX symbol; physical layer reset. TX symbol code when MAC/$\overline{SM}$ is not asserted; physical layer 30 reset when MAC/$\overline{SM}$ is asserted. |
| TXSYM1; TXDIS | O | TX symbol; transmitter disable. TX symbol code when MAC/$\overline{SM}$ is not asserted; transmitter disable when MAC/$\overline{SM}$ is asserted. |
| TXCLK | I | Transmit clock. Supplied by physical layer 30. |

| SIGNAL MNEMONIC | TYPE I-INPUT O-OUTPUT T-THREE-STATE | DESCRIPTION |
|---|---|---|
| RXDATA; | I | Must be equal to data rate (1,5, or 10 MHz). RX serial data. When $\overline{\text{SMREQ}}$ is asserted, this is SMRXD the station management data from physical layer 30. |
| RXSYM0; RSACK | I | When $\overline{\text{SMREQ}}$ is not asserted, this is normal RX serial data. RX symbol; physical layer reset acknowledge. RX symbol code when $\overline{\text{SMREQ}}$ is not asserted; reset acknowledge when $\overline{\text{SMREQ}}$ is asserted. |
| RXSYM1; JABINH | I | RX symbol; jabber inhibit. symbol code when $\overline{\text{SMREQ}}$ is not asserted, jabber inhibit indication when $\overline{\text{SMREQ}}$ is asserted. |
| RXCLK | I | Receive clock. Supplied by physical layer 30. Must be equal to data rate (1,5, or 10 MHz). |
| MAC/$\overline{\text{SM}}$ | O | MAC mode/station management. Indicated MAC mode when high and station management mode when low. Signal to physical layer 30 from TBC 10. |
| $\overline{\text{SMREQ}}$ | I | Station management request. Indicates the physical layer is in the management mode when asserted; otherwise normal operation. |
| VCC | — | Power Supply. 5.0 V ± 5%. |
| GND | — | Ground |

The TBC 10 serial interface is easily interfaced into any of the IEEE 802.4 physical layers types. The interface is designed to provide directly the minimum function required for baseband and still be expandable for more "intelligent" physical layers 10 that may be required for broadband. The serial interface is shown in FIG. 2 and truth tables are shown in FIGS. 5A, 5B, 5C and 5D.

Operation—When in the MAC operation mode, physical data units are transmitted and received as encoded atomic symbols as shown in FIGS. 5A-5D. When either channel is in the SM mode, the signal lines indicate the functions as detailed below:

1. MAC/$\overline{\text{SM}}$—signals the modem that the TBC 10 request channel is either in MAC mode or station management mode. That is:
when MAC/$\overline{\text{SM}}$=High;

TXSYM0
TXSYM1: Transmit physical data atomic symbols
TXDATA when MAC/$\overline{\text{SM}}$=low;

SMTXD—Transmit SM data to modem
RESET—Request for physical layer 30 reset
TXDIS—Request for transmitter disable with TXCLK supplied modem.

Figure 5E:
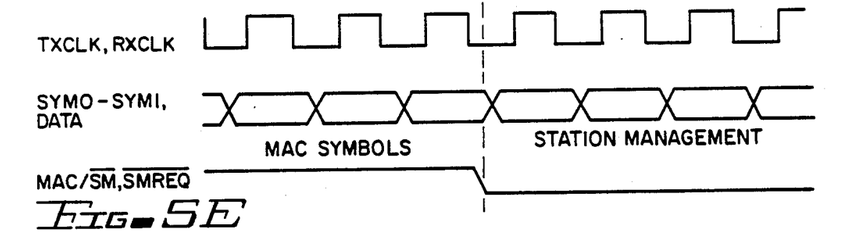
FIG. 5E illustrates a general symbol data timing for use in implementing a serial communications interface in accordance with the present invention.

2. $\overline{\text{SMREQ}}$—signals that the modem is in the station management mode when low. The $\overline{\text{SMREQ}}$ is asserted low in response to MAC/$\overline{\text{SM}}$=low request of a need for SM service, as an example, jabber inhibit timer has expired.
when $\overline{\text{SMREQ}}$=High;

RXSYM0
RXSYM1: Receive physical data atomic symbols
RXDATA when $\overline{\text{SMREQ}}$=low;

SMRXD—Receive SM data from modem
RSACK—Physical layer reset confirmation
JABINH—Japper inhibit indication with RXCLK supplied by modem Timing is illustrated in the timing diagrams of FIG. 5E. For normal MAC symbol transmission or reception, the symbol lines and mode control lines are synchronized to the appropriate clock, RXCLK or TXCLK. Also, in the management mode the signal lines are synchronized to the appropriate clock.

Figure 5F:
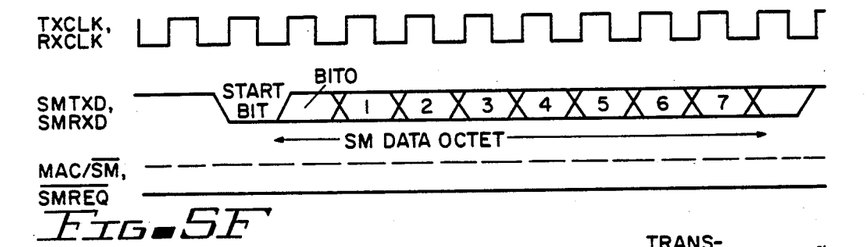
FIG. 5F illustrates a representative station management data transmission for use with the serial communications interface of the present invention.

The "protocol" associated with the SMTXD and SMRXD data channels is a simple bit pattern. The data line must remain high for some number of bit times (say 3 bit times) minimum between data transfers. The data line then would drop to "low" for one bit sent as octets and each octext can represent a specific service request or indication. See the timing diagram of FIG. 5F.

Figure 5G:
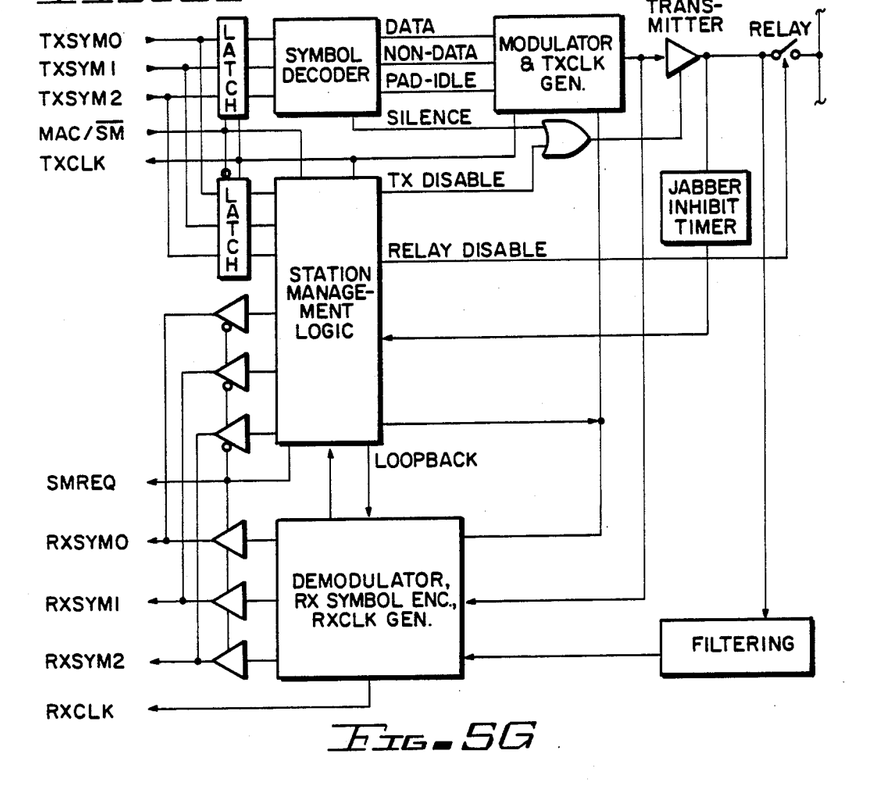
FIG. 5G illustrates a functional block diagram of a base band modem for implementing a serial communications interface in accordance with the present invention.

Application—For more "intelligent" modems, the full SM data channel capability can be used. However, the data channel signals plus dedicated SM lines also provide a simple means to implement a baseband modem. A typical application, as an example, is shown in FIG. 5G.

The only service not directly provided as a stated function is loopback. However, the SMTXD can give the loopback mode. If the SMTXD sends any bit pattern (SMTXD goes low) the loopback mode in enabled. In addition, if required, loopback with or without TXDIS is possible. To disable loopback (after entering MAC mode to transmit/receive data units), SM mode is re-entered and a reset is requested.

What has been provided therefore is an improved serial commmunications interface and method for a local area network controller. The interface and method of the present invention combines station management functions with normal data communications and reduces the required interfaces to a modem in a local area network. Still further, the present invention provides added station management capabilities allowing greater control of data and effectively doubles the use of a serial of communications interface to a local area network controller and expands its functionality.

While there have been described above the principles of the invention in conjunction with specific apparatus, it is to be clearly understood that the foregoing description is made only by way of example and not as a limitation to the scope of the invention. Particularly, while the present invention has been described in conjunction with a token bus network, the principles are nonetheless, similarly applicable to token ring and other LAN's.

What is claimed is:

1. A local area network including a serial communications interface for coupling a physical layer to a media access control layer and providing data and station management information therebetween comprising:
   a first control line coupled to said physical layer having one of first and second signals thereon;
   a plurality of data lines interconnecting said physical and media access control layers,
   whereby said data information may be transferred on said data lines to said physical layer from said media access control layer when said first signal is present and said station management information may be transferred on said data lines to said physical layer from said media access control layer when said second signal is present.

2. The local area network of claim 1 further comprising:
   a second control line coupled to said media access control layer having one of third and fourth signals thereon,
   whereby said data information may be transferred on said data lines to said media access control layer from said physical layer when said third signal is present and said station management information may be transferred on said data lines to said media access control layer from said physical layer when said fourth signal is present.

3. The local area network of claim 1 wherein said first control line is activatable by said media access control layer.

4. The local area network of claim 2 wherein said second control line is activatable by said physical layer.

5. The local area network of claim 1 wherein said data lines are bidirectional.

6. The local area network of claim 1 wherein said first and second signals are logic high and logic low levels respectively.

7. The local area network of claim 2 wherein said third and fourth signals are logic high and logic low levels respectively.

8. The local area network of claim 1 wherein said serial communications interface comprises a token bus controller.

9. The local area network of claim 8 wherein said token bus controller is an LSI circuit.

10. The local area network of claim 1 wherein said network is a token bus network.

11. The local area network of claim 1 wherein said physical layer comprises a modem.

* * * * *